(12) United States Patent
Hirai

(10) Patent No.: US 7,038,719 B2
(45) Date of Patent: May 2, 2006

(54) IMAGE SENSING APPARATUS, IMAGE PROCESSING METHOD, RECORDING MEDIUM, AND PROGRAM

(75) Inventor: Yuichi Hirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 767 days.

(21) Appl. No.: 10/244,882

(22) Filed: Sep. 16, 2002

(65) Prior Publication Data

US 2003/0058348 A1    Mar. 27, 2003

(30) Foreign Application Priority Data

Sep. 21, 2001    (JP) .............................. 2001-289678

(51) Int. Cl.
*H04N 5/76*    (2006.01)
(52) U.S. Cl. .............................................. 348/231.99
(58) Field of Classification Search ............ 348/231.99
See application file for complete search history.

(56) References Cited

U.S. PATENT DOCUMENTS 5,847,762 A * 12/1998 Canfield et al. ........ 375/240.15
5,960,155 A * 9/1999 Fukuoka et al. ............ 386/117
6,137,534 A * 10/2000 Anderson ................ 348/222.1
6,711,294 B1 * 3/2004 Hamzy et al. .............. 382/232
6,731,809 B1 * 5/2004 Taniguchi et al. .......... 382/236
6,933,970 B1 * 8/2005 Koshiba et al. ............. 348/273

* cited by examiner

*Primary Examiner*—David Ometz
*Assistant Examiner*—Adam L. Henderson
(74) *Attorney, Agent, or Firm*—Morgan & Finnegan, LLP

(57)    ABSTRACT

It is an object of the present invention to compress the image sensing data of a photographed image using different image compression schemes to generate image files compressed by respective image compression schemes without decreasing the throughput in photographing operation. In order to attain the above object, a lossless encoder which compresses image sensing data by a lossless compression scheme and a lossy encoder which compresses the image sensing data by a lossy compression scheme are provided in a digital signal processing unit. With this arrangement, image sensing data can be compressed by a lossless compression scheme in the lossless encoder and at the same time can be compressed by a lossy compression scheme in the lossy encoder at one photographing operation, thereby generating compressed image files compressed by respective image compression schemes without decreasing the throughput.

5 Claims, 5 Drawing Sheets

IMAGE SENSING APPARATUS, IMAGE PROCESSING METHOD, RECORDING MEDIUM, AND PROGRAM

FIELD OF THE INVENTION

The present invention relates to an image sensing apparatus, image processing method, recording medium, and program and, more particularly, to an image sensing apparatus, image processing method, recording medium, and program suitable for a digital still camera which records and saves, on a recording medium, compressed image data obtained by compressing image sensing data of a photographed image using different image compression schemes.

BACKGROUND OF THE INVENTION

Conventionally, in an image sensing apparatus such as a digital still camera, an electrical signal (image sensing data) of a photographed image, which is obtained by photoelectrically converting the photographed image in an image sensing element such as a CCD, undergoes predetermined processing to record as electric (magnetic) information the resultant image information (image data) of the photographed image on an external recording medium (e.g., memory card or hard disk). Completely unlike a conventional silver halide camera which photographs an object image by film exposure, a digital still camera enables reproduction of a photographed image as an electrical signal after photography by performing image processing for an electrical signal of the photographed image as positional information and recording the processed signal.

In recent years, in digital still cameras, megapixel processing has been realized for faithful reproduction of an image. The reproduction image quality of an image photographed by a digital still camera has approached that by a silver halide camera.

However, image data of a photographed image recorded/reproduced in a digital still camera requires a large amount of information (data). In particular, in still images for appreciative viewing or ones whose details matter, decimation of image data using human visual characteristics cannot be performed, and thus a large amount of data is necessary for a frame of still image.

For example, in megapixel-class digital still cameras, a photographed image to be recorded has a large amount of image data. If 12-bit data of a four million pixel photographed image is recorded, the data amount exceeds 6 Mbytes. Such a large amount of data is not suitable both for recording and saving on an external storage medium such as a memory card or hard disk and for transferring between devices via communication interfaces. Thus, when a large number of photographed images are recorded, their image data amount needs be decreased. Under the circumstances, in digital still cameras, the image data of photographed images to be recorded is generally compressed before recording, thereby decreasing the data amount of the photographed images.

Image compression schemes for compressing image data include lossless compression which enhances the retentivity (reproducibility) at the cost of the compression ratio and lossy compression which enhances the compression ratio at the cost of the retentivity (reproducibility). As a lossless compression scheme, e.g., a method of expanding differences between a sequence of image data into run-length information to encode the information using a table is commonly known. As a lossy compression scheme, a method of suppressing the high-frequency information of image data by orthogonal transform such as DCT (Discrete Cosine Transform) to encode the information using a table is known. Both image compression schemes are classified as conventional JPEG schemes. However, a JPEG scheme generally means the latter scheme, and the former is known as one for TIFF images.

Conventionally, to avoid the influence of block noise due to irreversible compression or the like, lossless compression has mainly been employed as an image compression scheme for digital still cameras because photographed images desirably have high quality. However, a rapid growth in number of pixels of a photographed image in recent years has aroused user's demands for selection with a preference for the image data size, and many digital still cameras using lossy compression schemes have appeared. Some users who give priority to improvement in image quality of photographed images select a digital still camera comprising an image compression means using a lossless compression scheme by which an unprocessed image faithful to a photographed image can be obtained as a reproduced image. Other users who give priority to the data capacity (i.e., give priority to reduction in amount of data in recording a photographed image) select a digital still camera comprising an image compression means using a lossy compression scheme.

Image compression means for lossless compression and lossy compression can both be provided in a digital still camera. However, in a conventional digital still camera, either one of lossless compression and lossy compression needs to be selected for an image file (image data) to be obtained by photography before actual photographing operation to continuously photograph without interruption. To this end, the device is arranged to compress by either one of the image compression means respectively for lossless compression and lossy compression in accordance with the selection, and an image file is obtained by the selected image compression scheme. That is, in a conventional digital still camera, only one of lossless- and lossy-compression image files can be obtained upon one photographing operation.

This is because lossless compression and lossy compression adopt completely different compression processing methods and they cannot synchronize with each other. Upon one compression operation, lossless compression and lossy compression cannot be simultaneously performed to generate respective image files.

SUMMARY OF THE INVENTION

It is an object of the present invention to compress the image sensing data of a photographed image using different image compression schemes to generate image files compressed by respective image compression schemes without decreasing the throughput.

In order to solve the above problems and attain the above object, an image sensing apparatus according to the first aspect of the present invention is characterized by having the following arrangement.

That is, there is provided an image sensing apparatus which compresses image sensing data from image sensing elements and records the data on a storage medium, comprising an image compression device which compresses one-page image sensing data by lossless and lossy compression schemes, wherein image sensing data compressed by parallel processing of the image compression device are respectively recorded on the storage medium as lossless- and lossy-compression image files.

Alternatively, an image sensing apparatus according to the second aspect of the present invention is characterized by having the following arrangement.

That is, there is provided an image sensing apparatus which converts optical information of an object into digital information and records the information on a primary storage as a compressed image file, comprising a controller which controls start of photographing operation of a photographed image and start of recording operation of image sensing data of the photographed image, a front-end processing device which performs correction processing for the image sensing data obtained by the photographing operation, a digital signal processing device which performs image processing and compression processing for the image sensing data corrected by the front-end processing device, a temporary storage device which stores the image sensing data processed by the digital signal processing device, and a primary storage device which records the image sensing data stored in the temporary storage device as a compressed image file, wherein the front-end processing device comprises an image sensing data storage device which temporarily stores the image sensing data obtained by the photographing operation, a storage controller which controls the image sensing data storage device, and a correction device which performs correction processing for the image sensing data supplied from the image sensing data storage device, the digital signal processing device comprises a plurality of data accumulation devices and a stop request device which outputs a wait request to the front-end processing device before any overflow occurs in all or at least one of the plurality of data accumulation devices, and the front-end processing device starts readout of image sensing data from the image sensing data storage device after the recording operation of the image sensing data is started in accordance with instructions from the controller and temporarily stops transfer output of corrected image sensing data to the digital signal processing device if a wait request from the stop request device is detected.

Alternatively, an image processing method according to the present invention is characterized by having the following arrangement.

That is, there is provided an image processing method of compressing image sensing data of a photographed image and recording the image sensing data on a storage medium, comprising the image compression step of performing compression processing for one-page image sensing data simultaneously by lossless and lossy image compression schemes and the recording step of respectively recording on the storage medium image sensing data compressed in the image compression step as lossless- and lossy-compression image files.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

An embodiment according to the present invention will be described with reference to the accompanying drawings.

A digital still camera using an image sensing apparatus according to the embodiment of the present invention simultaneously generates compressed image files compressed by lossless and lossy compression schemes only by supplying image sensing data of a photographed image once.

In the following description, the respective arrangements for realizing image sensing data compression processing by lossless and lossy compression schemes in a digital still camera will be first explained with reference to FIGS. 2 and 3. Then, the digital still camera according to the embodiment, which simultaneously generates compressed image files respectively compressed by lossless and lossy compression schemes will be described with reference to FIG. 1.

Figure 1:
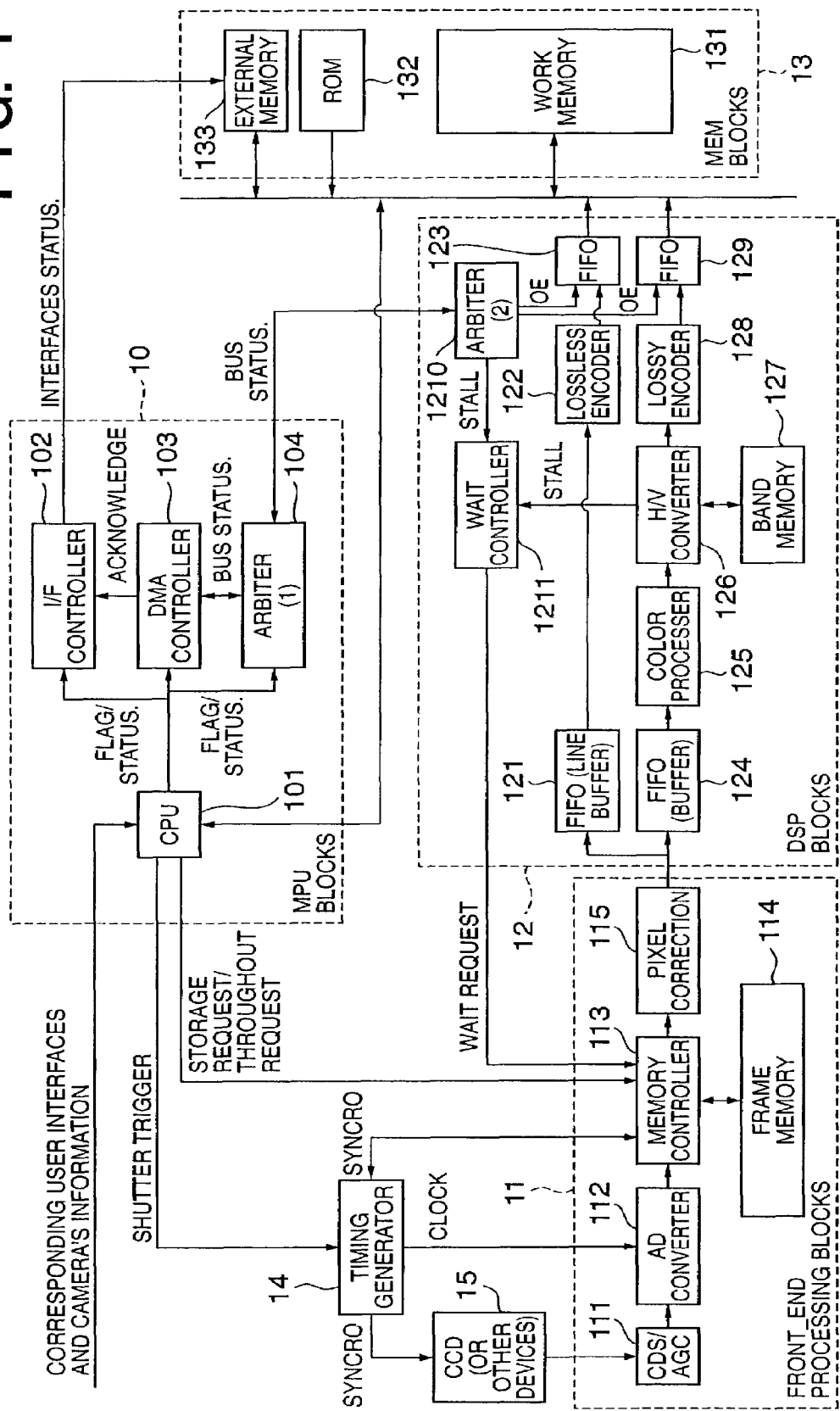
FIG. 1 is a block diagram showing an example of the arrangement of a digital still camera using an image sensing apparatus according to an embodiment of the present invention.
Figure 2:
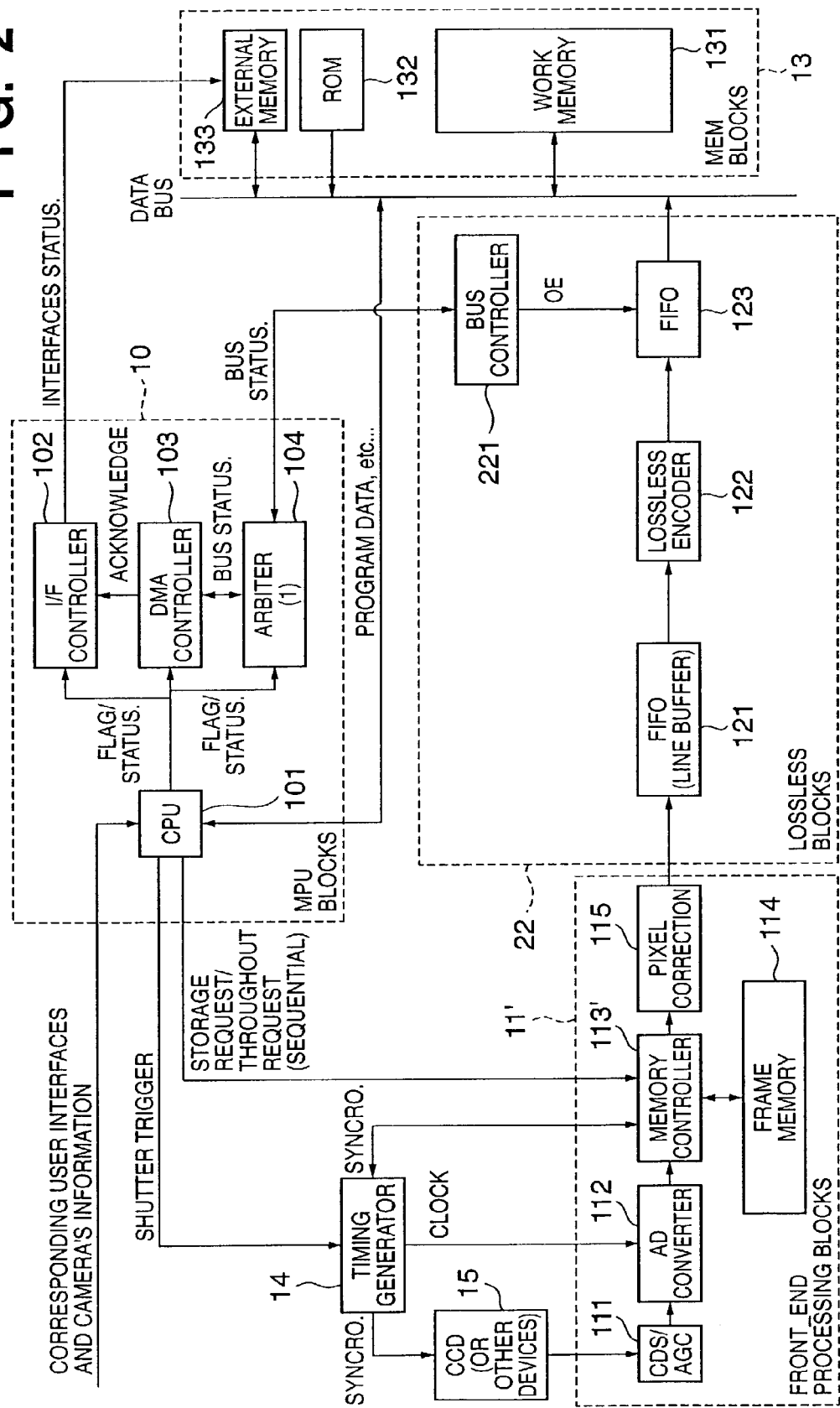
FIG. 2 is a block diagram showing the arrangement for implementing compression processing of the image sensing data of a photographed image by a lossless compression scheme.
Figure 3:
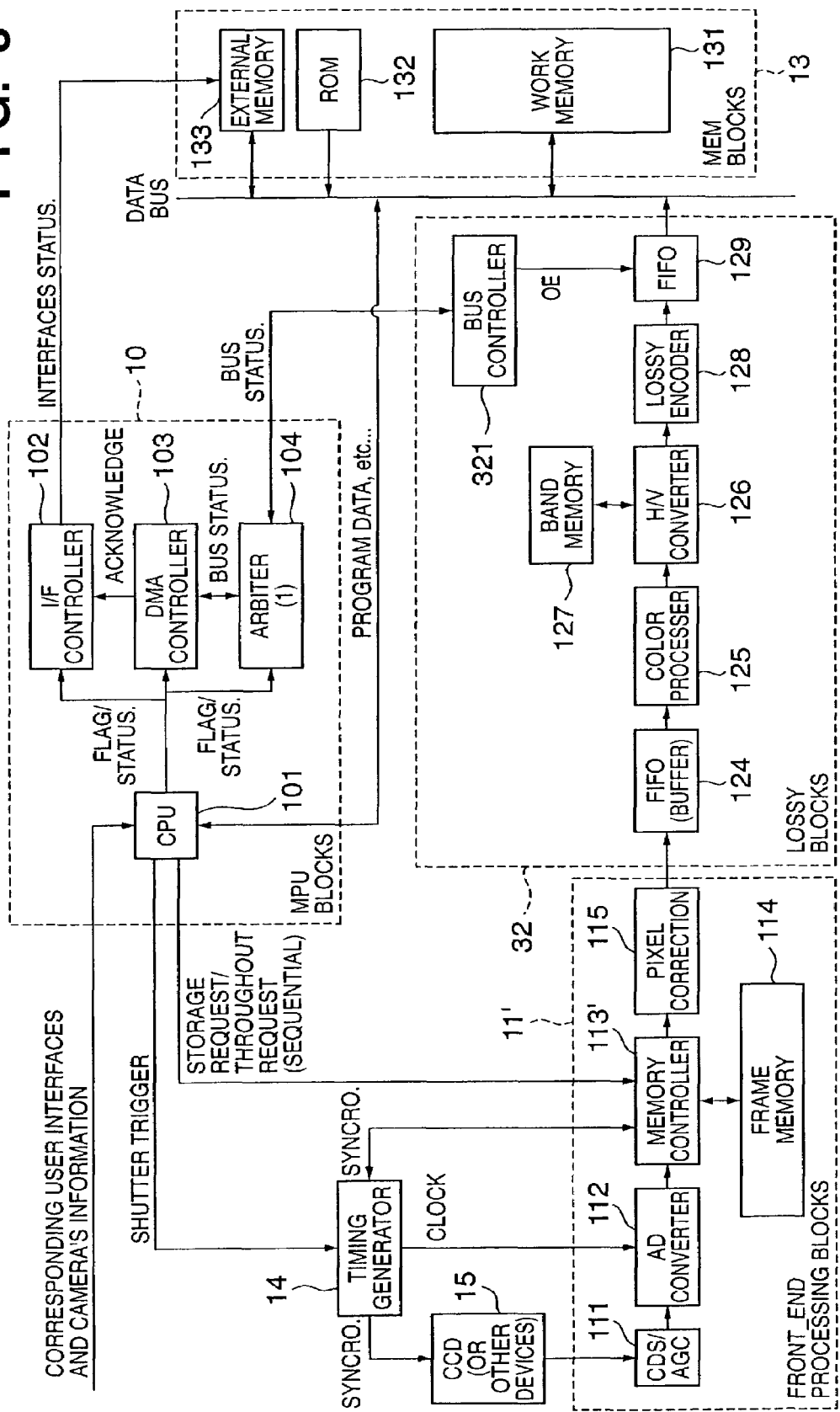
FIG. 3 is a block diagram showing the arrangement for implementing compression processing of the image sensing data of a photographed image by a lossy compression scheme.

In FIGS. 1 to 3, the arrangements for realizing compression processing of image sensing data by lossless and lossy compression schemes are shown, and a camera mechanism itself and a camera structure such as user interfaces like various buttons, which digital still cameras generally have, are omitted for convenience of explanation. However, this embodiment comprises a common camera structure. In addition, each broken line in FIGS. 1 to 3 surrounds components that form a group for convenience of explanation. FIG. 1 shows the internal arrangement of the digital still camera according to the embodiment. FIGS. 2 and 3 are diagrams obtained by simplifying the block diagram of FIG. 1 for convenience of explanation.

FIG. 2 is a block diagram showing the arrangement for realizing compression processing of image sensing data of a photographed image by a lossless compression scheme.

Referring to FIG. 2, MPU blocks 10 are comprised of a CPU 101 and its peripheral circuits (an I/F controller 102, a DMA controller 103, and an arbiter(1) 104). The CPU 101 communicates with a camera mechanism (not shown) and controls functional blocks in accordance with a program stored in a ROM 132 in mem (memory) blocks 13 to perform system processing (e.g., photographing processing, image compression processing, and data recording processing). When the CPU 101 receives a photography request from the camera mechanism (not shown), it outputs a shutter trigger to a timing generator 14.

Upon receiving the shutter trigger from the CPU 101, the timing generator 14 outputs a sync signal (photography start instruction) to an image sensing element 15 such as a CCD. The image sensing element is not limited to a CCD, and a CMOS sensor or the like may be used.

Image sensing data output from the CCD 15 is converted into frame data in front-end processing blocks 11'. The front-end processing blocks 11' is comprised of a CDS/AGC 111, an AD converter 112, a memory controller 113', a frame memory 114, and a pixel correction unit 115.

The image sensing data from the CCD 15 is transferred to the CDS/AGC 111 to guarantee a dynamic range. Then, the image sensing data is input to the AD converter 112 and converted into digital data in synchronism with a synchronous clock supplied from the timing generator 14.

In a digital still camera which finally records image sensing data as an image file, frame-synchronized times series processing cannot be performed for image sensing data obtained from the CCD 15, and the periodicity is canceled by image processing in the digital still camera. The digital camera shown in FIG. 2 as an example has a high-speed continuous shot function. The image sensing data converted into digital data in the AD converter 112 is sequentially accumulated in the frame memory 114 in the scanning order of the CCD 15 in accordance with the control of the memory controller 113'.

The frame memory 114 has a storage capacity large enough to store frame data (image sensing data) of a plurality of pages. A normal memory is employed as the frame memory 114 because the scanning order of the CCD 15 does not necessarily coincide with that in image processing. For this reason, the memory controller 113' is arranged in the data path of image sensing data, as shown in FIG. 2, to control storage/readout timings and orders of image sensing data in/from the frame memory 114. The image sensing data read out from the frame memory 114 by the memory controller 113' undergoes correction of defective pixels of the CCD 15, shading correction, black level correction, and the like.

The image sensing data corrected by the pixel correction unit 115 is supplied to lossless blocks 22. The lossless blocks 22 are comprised of an input buffer (FIFO) 121, a lossless encoder 122, an output buffer (FIFO) 123, and a bus controller 221. The image sensing data supplied to the lossless blocks 22 is transferred to the FIFO 121, which is arranged to absorb delays in sequential processing in the lossless encoder 122. The lossless encoder 122 performs lossless compression processing (difference processing, run-length processing, table formation, and the like) for the image sensing data supplied from the FIFO 121.

To save compressed image data (frame data) obtained by compressing the image sensing data in the lossless blocks 22 as a compressed image file, the compressed image data (frame data) is temporarily stored in a work memory 131. The compressed image data (frame data), which is sequentially processed by the lossless blocks 22 and temporarily stored in the work memory 131, undergoes header information appending processing by the CPU 101, is converted into a compressed image file, and recorded on an external memory 133.

The work memory 131 is connected to a data bus, to which other devices are also connected. A plurality of devices including the work memory 131 share the data bus. For this reason, to avoid a bus fight such as a data collision in the data bus, each of the plurality of devices must output data to the data bus after acquiring a bus right in accordance with bus arbitration. Bus arbitration in the data bus is performed by an arbiter(1) 104. The arbiter(1) 104 shown in FIG. 2 performs bus arbitration between the bus controller 221 in the lossless blocks 22 and the DMA controller 103. The FIFO 123 is provided to absorb delays in bus arbitration performed in the arbiter(1) 104.

FIG. 3 is a block diagram showing the arrangement for realizing compression processing of image sensing data of a photographed image by a lossy compression scheme. The same reference numerals in FIG. 3 denote blocks having the same functions as those in FIG. 2, and a repetitive description thereof will be omitted.

Referring to FIG. 3, lossy blocks 32 compress image sensing data of a photographed image by a lossy compression scheme. The lossy blocks 32 are comprised of an input buffer (FIFO of several H components) 124, a color processor 125, an H/V converter 126, a band memory 127, a lossy encoder 128, an output buffer (FIFO) 129, and a bus controller 321.

The FIFO 124 is arranged to absorb delays in subsequent processing in the lossy blocks 32, similarly to the FIFO 121 shown in FIG. 2. Image sensing data supplied from the pixel correction unit 115 to the lossy blocks 32 is transferred to the FIFO 124. The FIFO 124 has several stages of taps in the V (vertical scanning) direction to perform color processing by the color processor 125, which is connected to the output side of the FIFO 124. The color processor 125 performs interpolation based on the CCD data arrangement, white balance processing, color correction, gamma processing, pseudo color processing, and the like for the image sensing data supplied from the FIFO 124.

In FIG. 3, the H/V converter 126 and the band memory 127 are inserted between the color processor 125 and the lossy encoder 128 to perform JPEG processing as lossy compression processing. The H/V converter 126 rearranges the image sensing data, which has been in the raster scanning order, in the block scanning order to meet conditions for inputting the image sensing data to the lossy encoder 128. JPEG processing uses 8×8 pixel blocks (in other 4:2:2 processes, 1MCU=16 (H: horizontal direction)×8 pixels (V: vertical direction)). The band memory 127 handles eight rasters as one band and is controlled to permit the H/V converter 126 to perform H/V conversion after several bands are accumulated.

The image sensing data H/V converted by the H/V converter 126 is supplied to the lossy encoder 128, where the image sensing data undergoes lossy compression processing (DCT processing, table formation, and the like). The bus controller 321 and the FIFO 129 are respectively similar to the bus controller 221 and the FIFO 123 shown in FIG. 2, and a description thereof will be omitted.

FIG. 1 is a block diagram showing the main components, which pertain to the present invention, of an example of the arrangement of a digital still camera using an image sensing apparatus according to the embodiment of the present invention. The same reference numerals in FIG. 1 denote blocks having the same functions as those in FIGS. 2 and 3.

The digital still camera according to the embodiment comprises DSP blocks 12 including the lossless encoder 122 and the lossy encoder 128, as shown in FIG. 1, to obtain both compressed image files compressed by lossless and lossy compression schemes at one photographing operation. The digital still camera also comprises an arbiter(2) 1210 for selectively releasing respective data paths to a data bus in compressing processing by two different image compression schemes and a WAIT controller 1211 for enabling the DSP blocks 12 themselves to avoid any possible FIFO overflow.

In this embodiment, a wait request output from the WAIT controller 1211 in the DSP blocks 12 is directly supplied to the memory controller 113, thereby controlling (outputting/stopping) to transfer image sensing data whose pixels are corrected by the front-end processing blocks 11 in units of H components (rasters). This makes it possible to avoid any data overflow of image sensing data, which are supplied to data paths at a time and processed, in each of the data paths to perform parallel processing.

With the above arrangement, the digital still camera according to the embodiment can compress one-page still image data using different image compression schemes to simultaneously generate separate image files compressed by respective image compression schemes upon one photographing operation (supply of one-page still image data of a photographed image) without decreasing the throughput.

As shown in FIG. 1, the digital still camera according to the embodiment comprises the MPU blocks 10, the front-end processing blocks 11, the DSP blocks 12, and the mem blocks 13.

The MPU blocks 10 comprise the CPU 101 which communicates (handshake) with a camera mechanism (not shown) and controls functional blocks (digital unit) in accordance with a program stored in the ROM 132 in the mem blocks 13, and its peripheral circuits. The peripheral circuits include the I/F controller 102 which controls data writing in the external memory 133, the DMA controller 103 which performs DMA (Direct Memory Access) when data in, e.g., the I/F controller 102 is transferred in response to an operation by the CPU 101, and the arbiter(1) 104 which performs bus arbitration in response to bus requests from external devices connected to the DMA controller 103 and the data bus.

When the timing generator 14 receives a shutter trigger as a photographing operation instruction, it generates photography timings (sync signals as photography start instructions) and photographed data capture timings and supplies sync clocks for image data.

When a sync signal as a photography start instruction is supplied from the timing generator 14, the image sensing element 15 outputs image sensing data (output data). If, e.g., a CCD is employed as the image sensing element 15, the image sensing element 15 reads out accumulated charges and outputs them in accordance with timings supplied from the timing generator 14. Note that the image sensing element 15 is not limited to a CCD, and a CMOS sensor or the like may be employed.

The image sensing data output from the CCD 15 is supplied to the front-end processing blocks 11, where the image sensing data undergoes predetermined processing in the CDS/AGC 111. Then, the image sensing data is converted into digital data in synchronism with a sync clock supplied from the timing generator 14 in the AD converter 112.

The thus obtained image sensing data is sequentially stored in the frame memory 114 in accordance with the scanning order of the CCD 15 under the control of the memory controller 113. When the memory controller 113 receives a read request of the image sensing data (frame data) stored in the frame memory 114 from the CPU 101, it starts reading out the frame data from the frame memory 114 to output the read-out frame data to the pixel correction unit 115, which is connected to the output side of the frame memory 114. The pixel correction unit 115 performs correction processings such as correction of defective pixels of the CCD 15, shading correction, black level correction, and the like for the supplied frame data to supply it to the DSP blocks 12.

The CPU 101 shown in FIG. 1 also outputs a write request to the memory controller 113. This request is used to synchronize (frame) sync signals from the timing generator 14 for driving the CCD 15 and (frame) sync signals in the memory controller 113 for driving the frame memory 114. Note that the memory controller 113 may receive shutter triggers from the CPU 101 instead of supplying them directly to the timing generator 14 and transfer the shutter triggers synchronized inside to the timing generator 14.

A read request is sent from the CPU 101 to the memory controller 113 after frame data of one frame is completely stored. Reading out of the frame data of one frame may be started in the middle of storing the frame data instead of after storing it.

A data path for lossless compression processing and a data path for lossy compression processing are present in the DSP blocks 12. In the DSP blocks 12, lossless compression processing and lossy compression processing are simultaneously performed for image sensing data supplied from the front-end processing blocks 11 in the respective data paths for lossless compression processing and lossy compression processing. In the following description, the data paths for lossless compression processing and lossy compression processing will be separately explained. However, as described above, lossless compression processing and lossy compression processing are simultaneously performed.

In the data path for lossless compression processing, image sensing data (frame data) supplied from the front-end processing blocks 11 is stored in the FIFO 121. The FIFO is arranged to absorb delays in subsequent processing and has storage capacity large enough to store data corresponding to the width of one raster so as to guarantee processing in units of rasters. The FIFO 121 preferably has a storage capacity of two rasters or more as safety measures to cope with a stall status which may occur in the FIFO 123 due to, e.g., failure in acquisition of a bus right.

The frame data stored in the FIFO 121 is output from the FIFO 121 and supplied to the lossless encoder 122. The lossless encoder 122 performs lossless compression processing (difference processing, run-length processing, table formation, and the like) for the supplied frame data to sequentially store the frame data having undergone lossless compression processing in the FIFO 123. Note that the frame data is not subjected to color processing or the like in the lossless encoder 122.

On the other hand, in the data path for lossy compression processing, image sensing data (line data) of several rasters is stored in the FIFO 124. This storing of line data in the FIFO 124 is performed to establish a relationship between target pixels and reference pixels. The relationship between target pixels and reference pixels is directly input to the color processor 125 to be used for interpolation in the color processor 125. The color processor 125 performs interpolation, white balance processing, color correction, gamma processing, pseudo color processing, and the like for the image sensing data supplied from the FIFO 124.

The H/V converter 126 converts the data scanning order of the image sensing data to perform lossy compression processing for the image sensing data. In FIG. 1, the data arrangement must be converted into the order of blocks each having 8×8 pixels (or, e.g., 8×16 pixels) to perform DCT, which is a kind of JPEG, as lossy compression processing. A detailed description of a conversion method will be omitted. In addition, the band memory 127 is arranged to temporarily store band data in units of block widths (widths in the V (vertical) direction) in converting the data scanning order of image sensing data by the H/V converter 126.

The image sensing data H/V converted by the H/V converter 126 is output to the lossy encoder 128. In the lossy encoder 128, the image sensing data undergoes lossy compression processing (DCT processing, table formation, and the like) and then is stored in the FIFO 129.

When the amount of compressed image data which is obtained by compressing image sensing data and stored in the FIFOs 123 and 129 reaches a certain threshold or more, the arbiter(2) 1210 demands a bus right from the MPU blocks 10 and performs arbitration to decide which FIFO preferentially gets to output data. The arbiter(2) 1210 also measures the sizes of the free spaces in the storage capacities of the FIFOs 123 and 129. When the free space size of the storage capacity of each of the FIFOs 123 and 129 is below than a certain threshold, the arbiter(2) 1210 outputs a stall signal, to the WAIT controller 1211, indicating that subsequent processing is delayed.

To avoid any overflow in the FIFOs and perform processing in units of rasters, each of the FIFOs must have data storage capacity of at least one raster. For example, if a one-raster dual port memory is arranged at a location for each of the FIFOs to make ports alternately operate for every raster, data loss may not occur.

In addition to a stall signal from the arbiter(2) 1210, a stall signal from the H/V converter 126 indicating that the band memory 127 has little free space can be input to the WAIT controller 1211.

A LCD for display or the like as a user interface and/or a data path for generating thumbnail images as a data path may be provided, though neither is shown in FIG. 1. Though a memory controller or the like which controls the work memory 131 in the mem blocks 13 is also not shown in FIG. 1, a memory controller for controlling the work memory 131 may be provided or the work memory 131 may be controlled by another memory controller or the like.

Figure 4:
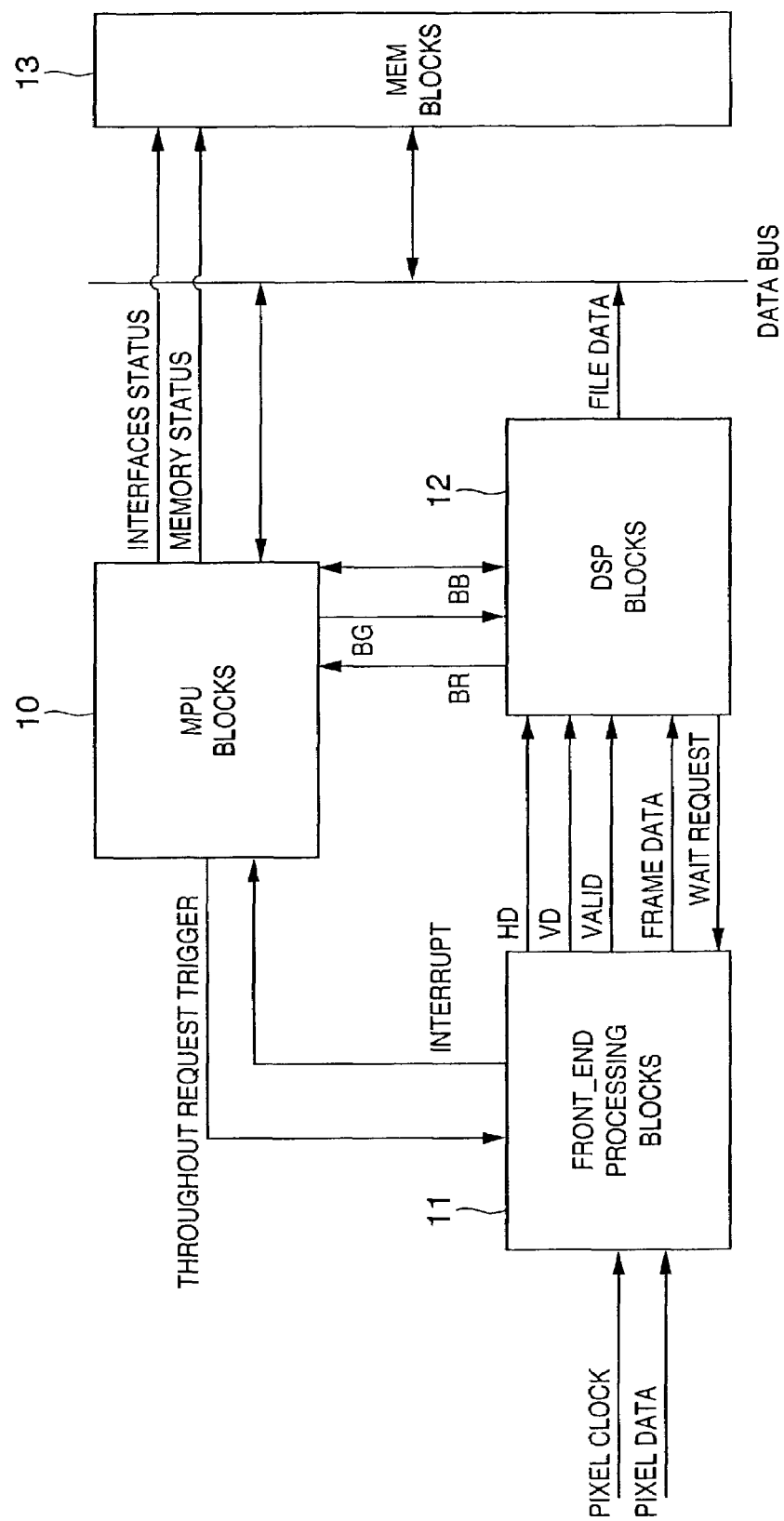
FIG. 4 is a block diagram schematically showing an example of the arrangement of a digital still camera according to the embodiment.

FIG. 4 is a block diagram schematically showing an example of the arrangement of the digital still camera shown in FIG. 1 and shows the MPU blocks 10, the front-end processing blocks 11, the DSP blocks 12 and the mem blocks 13, and the relationship between them.

Image sensing data and a sync clock are respectively supplied from the CCD 15 shown in FIG. 1 and the timing generator 14. After the image sensing data is stored in the frame memory 114 in the front-end processing blocks 11 in synchronism with the sync clock, the MPU blocks 10 output a read request signal to the front-end processing blocks 11 to generate an image file. This read request signal is an image sensing data read-out signal for the front-end processing blocks 11. When the front-end processing blocks 11 detect that the read request signal turns to "true", readout of image sensing data from the frame memory 114 is started.

When the front-end processing blocks 11 receive a read request signal from the MPU blocks 10, it reads out the image sensing data from the frame memory 114 and performs pixel correction processing to supply the image sensing data having undergone pixel correction processing as frame data to the DSP blocks 12 connected to the output side of the front-end processing blocks 11. In addition to the frame data, sync signals HD and VD and a valid data signal VALID are supplied from the front-end processing blocks 11 to the DSP blocks 12. The frame data is output in synchronism with the sync signals HD and VD.

The sync signal HD is a signal indicating the head of a raster, i.e., indicating the interval between two adjacent rasters of one frame, and the sync signal VD indicates the start of a frame in the vertical direction (in a digital still camera, the head of a frame).

The valid data signal VALID is a signal indicating a period in one raster, during which data is valid. If the signal is "true", valid data is transferred in the raster. On the other hand, if the signal is "false", no valid data is transferred (transfer data is not present) in the raster. As described above, a digital still camera need not process frame data isochronally and continually, writes data on a recording medium at a low speed, and cannot perform processing at a constant rate. Accordingly, the digital still camera must adjust the transfer interval in accordance with the storage capacities of the FIFOs so as not to cause any overflow. To continually generate sync signals HD at the same intervals, the distinction between rasters in which data is transferred and ones in which data is not transferred is determined in accordance with the storage capacities of the FIFOs. The valid data signal VALID is used to indicate the distinction.

The DSP blocks 12 detect the image sensing data having undergone pixel correction processing and supplied from the front-end processing blocks 11 on the basis of the sync signals HD and VD and valid data signal VALID, and simultaneously perform lossless compression processing and lossy compression processing for the detected image sensing data. Since in the processing performed in the color processor 125, image sensing data is transferred by in-phase transfer, the circuit constituting the color processor 125 continues to process transferred data regardless of whether the transferred data is valid or not. Therefore, in processing subsequent to that in the color processor 125, the start of a frame and that of a raster are detected by detecting the sync signals HD and VD to confirm the positional relationship in the processing.

When the DSP blocks 12 perform lossless compression processing and lossy compression processing for the detected image sensing data, the arbiter(2) 1210 in the DSP blocks 12 outputs a bus right request signal BR to the arbiter(1) 104 in the MPU blocks 10 to demand a bus right of the data bus. In response to the output of the bus right request signal BR, a bus right grant signal BG is output from the arbiter(1) 104 to the arbiter(2) 1210. Upon receiving the bus right grant signal BG, the arbiter(2) 1210 outputs a bus busy signal BB and at the same time outputs an output enable signal OE to either one of the FIFOs 123 and 129. This makes the one of the FIFOs 123 and 129 output compressed image data obtained by compressing image sensing data to the work memory 131 in the mem blocks 13 via the data bus.

The work memory 131 is driven by outputting a memory status signal from the MPU blocks 10. When compressed image files are stored in the work memory 131, the MPU blocks 10 causes the work memory 131 to write the stored compressed image files in the external memory 133. At this time, the MPU blocks 10 output an interface status signal to control writing in the external memory 133.

Figure 5:
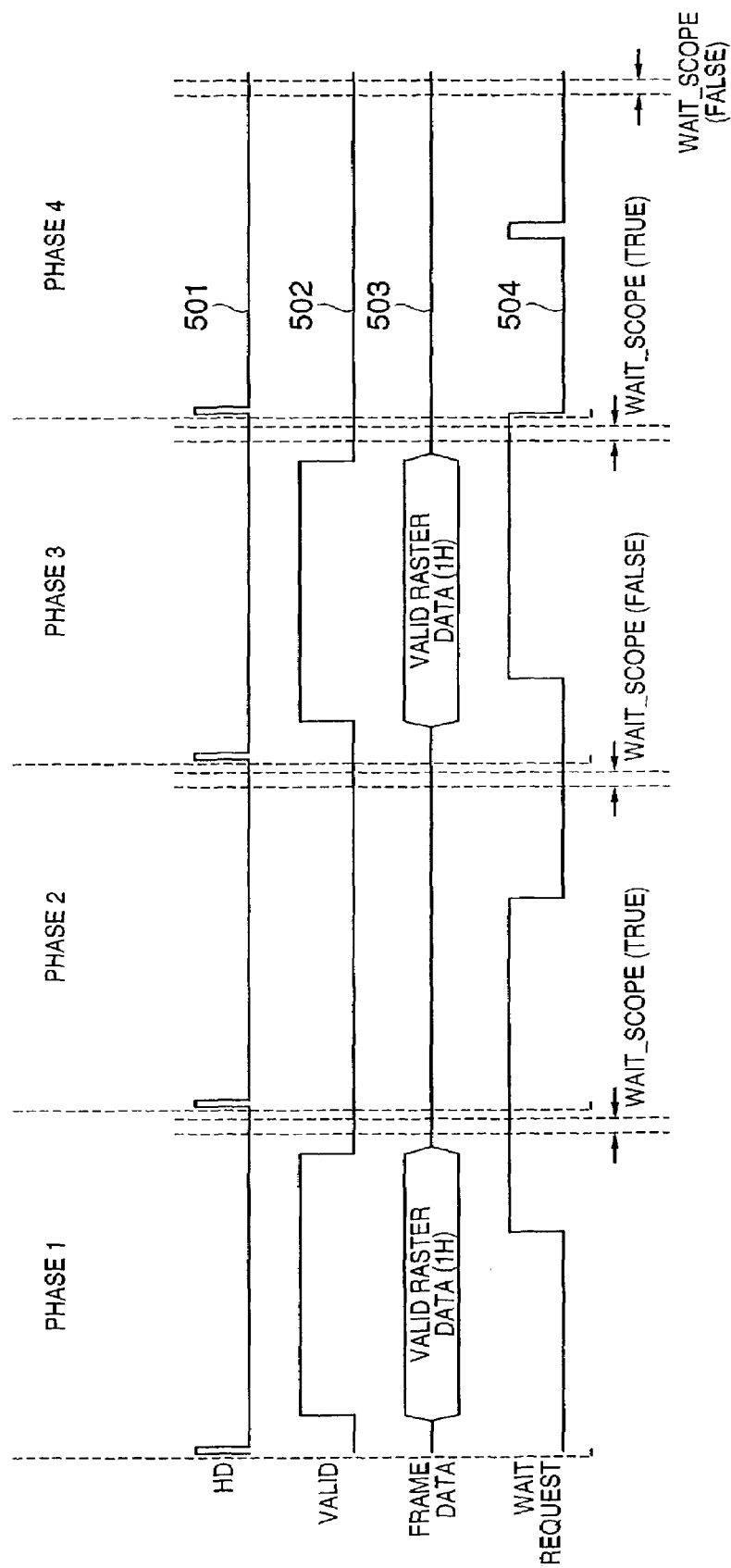
FIG. 5 is a chart for explaining transfer of frame data in the digital still camera according to the embodiment.

With the above operation, respective compressed image files compressed by lossless and lossy compression schemes are generated upon one readout operation of the image sensing data of a target frame from the frame memory 114. This can be achieved by controlling a stall status by the DSP blocks 12. The DSP blocks 12 output a wait request signal to the front-end processing blocks 11. FIG. 5 shows the relationship between the wait request signal, the sync signal HD, the valid data signal VALID, and the frame data. In FIG. 5, this relationship is shown for an arbitrary period of time during frame transfer, and the sync signal VD is not shown.

Referring to FIG. 5, reference numeral 501 denotes the sync signal HD. Adjacent pulses of the sync signal HD have even intervals, and a pulse indicates a transition from one raster to another. Reference numeral 502 denotes the valid data signal VALID, which indicates the validity/invalidity of the frame data in a raster (interval between adjacent pulses of the sync signal HD). Note that when the valid data signal VALID is high, the frame data is valid in FIG. 5. Reference numeral 503 denotes frame data, and valid data is output in units of rasters in accordance with the valid data signal VALID 502 during the period of the sync signal HD. These signals are output from the front-end processing blocks 11, as described above.

Reference numeral 504 denotes a wait request signal which is output from the DSP blocks 12. The status of the wait request signal 504 (wait request status) is detected in the front-end processing blocks 11. In this embodiment, the wait request signal 504 is not detected at all times. As shown in FIG. 5, the wait request signal 504 is checked for a wait-scope which is determined in advance, thereby determining whether valid raster data should be transferred or not in the next period (raster).

In FIG. 5, four periods, i.e., phases 1 to 4 are shown. The wait request signal 504 is "true" during the wait-scope in phase 1, and valid raster data is not output in the next period, i.e., phase 2. The wait request signal 504 is "false" during the wait-scope in phase 2, and valid raster data is output in the next period, i.e., phase 3. Similarly, the wait request signal 504 is "true" during the wait-scope in phase 3, and valid raster data is not output in the next period, i.e., phase 4. As described above, in this embodiment, it is controlled in units of rasters whether valid raster data is output or not.

For this reason, in the DSP blocks 12 as well, data input/output is controlled in units of rasters, thereby performing both lossless compression processing and lossy compression processing for single frame data.

In FIG. 5, the wait request signal 504 is checked for a wait-scope which is determined in advance. However, the wait request signal 504 may be monitored at all times.

As has been described above in detail, according to the embodiment, the lossless encoder 122 which compresses image sensing data by a lossless compression scheme and the lossy encoder 128 which compresses image sensing data by a lossy compression scheme, the arbiter(2) 1210 for selectively opening the data bus for outputting compressed image sensing data to the respective data paths of the lossless encoder 122 and the lossy encoder 128, and the WAIT controller 1211 for avoiding any possible FIFO overflow are provided in the DSP blocks 12.

With this arrangement, image sensing data can be compressed by a lossless compression scheme in the lossless encoder 122 and at the same time can be compressed by a lossy compression scheme in the lossy encoder 128 upon one photographing operation (supply of image sensing data of a photographed image). That is, image sensing data can be compressed by lossless and lossy compression schemes to simultaneously generate separate compressed image files compressed by respective image compression schemes at one photographing operation without decreasing the throughput of a digital still camera.

In addition, a wait request output from the WAIT controller 1211 in the DSP blocks 12 is directly supplied to the memory controller 113 which controls readout of image sensing data from the frame memory 114, thereby controlling (outputting/stopping) to transfer image sensing data from the front-end processing blocks 11 in units of rasters. This makes it possible to avoid any overflow of image sensing data, which are supplied to data paths at a time, in each of the data paths to simultaneously perform compression processings using lossless and lossy compression schemes.

In the above embodiment, one encoder is shown as each of the lossless encoder 122 which performs compression by a lossless compression scheme and the lossy encoder 128 which performs compression by a lossy compression scheme. The present invention is not limited to this. The present invention can include an arbitrary number of encoders if respective data paths are prepared for the encoders and the arbiter(2) 1210 and the WAIT controller 1211 are arranged to avoid any overflow of FIFOs provided in the data path of each encoder.

OTHER EMBODIMENT

A case is included in the scope of the present invention wherein software program codes for realizing the functions of the above-described embodiment are supplied to a computer in an apparatus or a system which is connected to various devices so as to make the devices operable to realize the functions of the above-described embodiment, and the devices are caused to operate in accordance with the program codes stored in the computer (or a CPU or an MPU) of the system or the apparatus.

In this case, the program codes realize the functions of the above-described embodiment by themselves, and the program codes themselves and a means for supplying the program codes to the computer, i.e., a recording medium storing the program codes constitute the present invention. As a recording medium storing the program codes, a flexible disk, a hard disk, an optical disk, a magnetooptical disk, a CD-ROM, a magnetic tape, a nonvolatile memory card, a ROM, or the like can be used.

The program codes are included in the embodiment of the present invention not only when the functions of the above-described embodiment are realized by causing the computer to execute the supplied program codes but also when the functions of the above-described embodiment are realized by collaboration of the program codes and an OS (operating system) or another application software running on the computer.

The scope of the present invention also includes a case wherein the functions of the above-described embodiment are realized when the supplied program codes are stored in the memory of a function expansion board inserted into the computer or a function expansion unit connected to the computer, and the CPU of the function expansion board or function expansion unit performs part or all of actual processing on the basis of the instructions of the program codes.

As has been described above, according to the above-described embodiment, a plurality of image compression means for compressing supplied image sensing data obtained by photographing operation simultaneously by different image compression schemes are provided. Consequently, image sensing data obtained at one photographing operation can promptly be compressed by different image compression schemes. This makes it possible to generate respective image files obtained by compressing image sensing data of a photographed image using different image compression schemes without decreasing the throughput in photographing operation.

Therefore, for example, the performance of an image sensing apparatus can be improved, and at the same time a user demand for simultaneous generation of respective compressed image files by lossless and lossy compression schemes can be met. Besides, since the throughput in photographing operation does not decrease, respective compressed image files compressed by lossless and lossy compression schemes can simultaneously be generated without damaging the high-speed continuous shot function.

Moreover, according to the embodiment, simultaneous generation of respective compressed image files by lossless and lossy compression schemes, which can be performed during high-speed continuous shot, can be realized without causing a decrease in throughput. The work environment of a photographer as a user can remarkably be enriched. More specifically, the user can process unprocessed image sensing data using a developed image compressed by a lossy compression scheme as a reference image.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus which converts optical information of an object into digital information and records the digital information in a primary storage as a compressed image file, comprising:
    a controller which controls start of photographing operation of a photographed image and start of recording operation of the photographed image;
    a front-end processing device which performs correction processing for image sensing data obtained by the photographing operation;
    a digital signal processing device which performs image processing and compression processing for the image sensing data corrected by said front-end processing device;
    a temporary storage device which stores the image sensing data processed by said digital signal processing device; and
    a primary storage device which records the image sensing data stored in said temporary storage device as a compressed image file,
    said front-end processing device comprising:
    an image sensing data storage device which temporarily stores the image sensing data obtained by the photographing operation;
    a storage controller which controls said image sensing data storage device; and
    a correction device which performs correction processing for the image sensing data supplied from said image sensing data storage device, said digital signal processing device comprising:
    a plurality of data accumulation devices; and
    a stop request device which outputs a wait request to said front-end processing device before any overflow occurs in all or at least one of said plurality of data accumulation devices,
    wherein said front-end processing device starts readout of image sensing data from said image sensing data storage device after recording operation of the image sensing data is started in accordance with instructions from said controller and temporarily stops transfer output of corrected image sensing data to said digital signal processing device if a wait request from said stop request device is detected.

2. The apparatus according to claim 1, wherein said digital signal processing device comprises:
    a plurality of image compression devices which compresses the image sensing data;
    an input data path arranged to cause said plurality of image compression devices to operate simultaneously;
    an accumulation output device independently arranged to accumulate and output image sensing data compressed by said image compression devices; and
    a bus arbitration device which grants said accumulation output device ranged independently a bus right to a data bus connected to said temporary storage device, and said bus arbitration device acquires storage capacity of said accumulation output device and notifies said stop request device of a status before any overflow occurs in all or at least one of said accumulation output devices.

3. The apparatus according to claim 1, wherein the notification to said stop request device includes a notification from said bus arbitration device and a notification from a data accumulation control device which controls said data accumulation device.

4. The apparatus according to claim 1, wherein temporary stop of transfer output of corrected image sensing data to said digital signal processing device in accordance with a wait request from said stop request device is performed in units of rasters of a frame which is controlled by said front-end processing device.

5. The apparatus according to claim 1, wherein a period during which detection of any wait request output from said stop request device is performed by said front-end processing means is arbitrarily set in a raster period, and detection of any wait request is performed every raster period, and when a wait request is detected, said front-end processing device temporarily stops output of valid image sensing data in a next raster period.

* * * * *